A. H. ALBERSHARDT.
EMERGENCY VEHICLE WHEEL.
APPLICATION FILED AUG. 7, 1916.
1,324,776.
Patented Dec. 16, 1919.
2 SHEETS—SHEET 1.
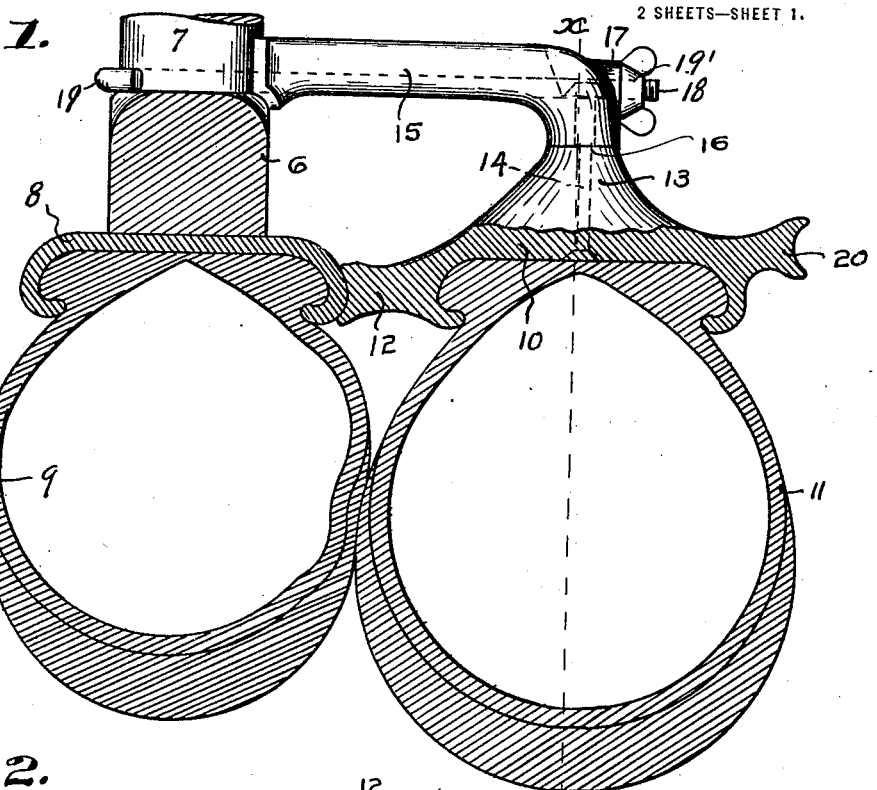
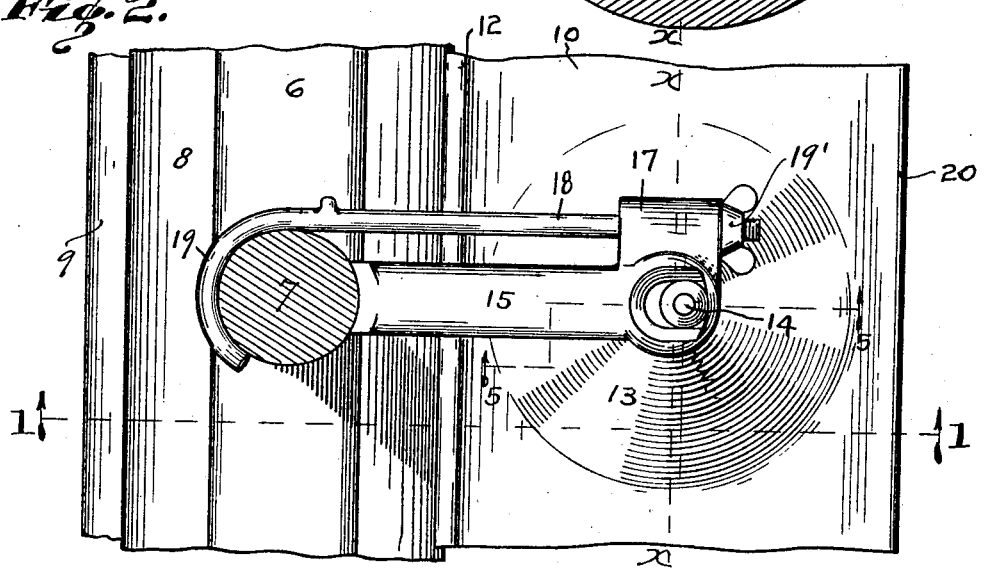
Inventor,
August H. Albershardt,
By Minturn & Worner,
Attorneys.

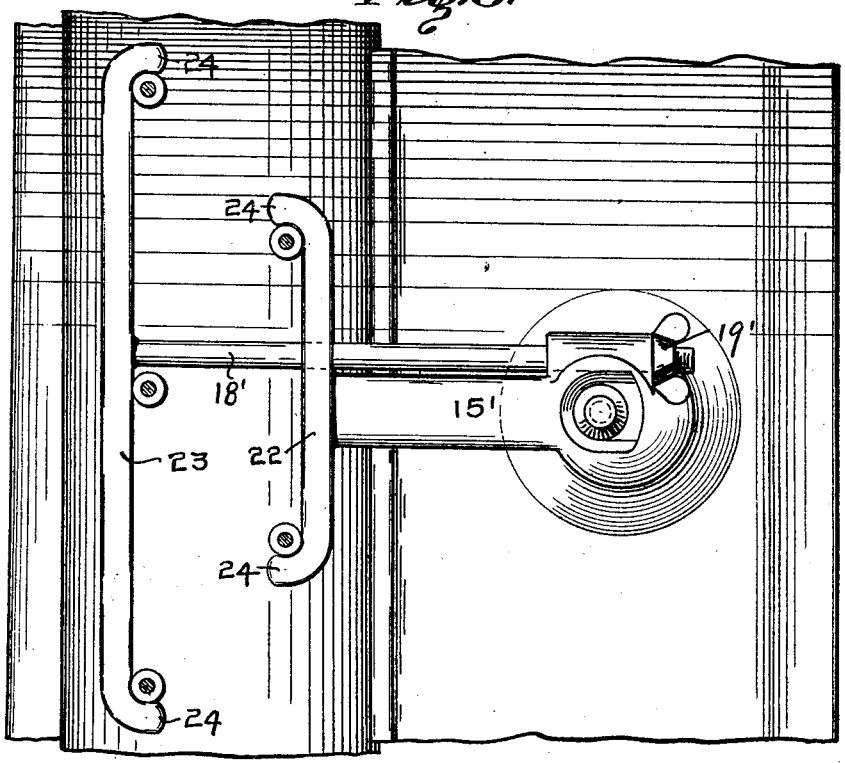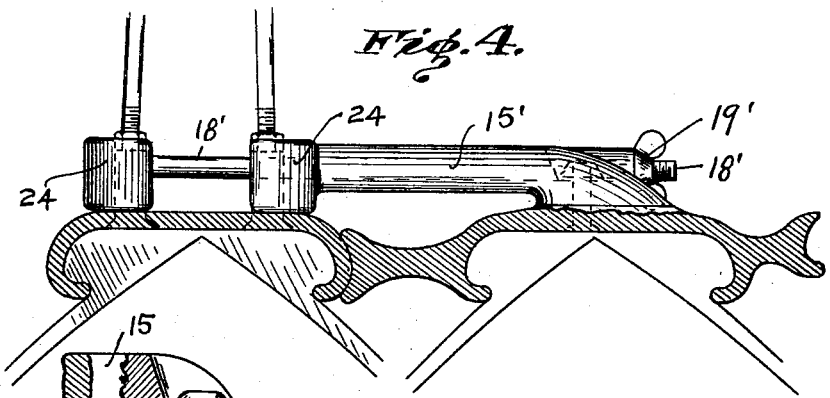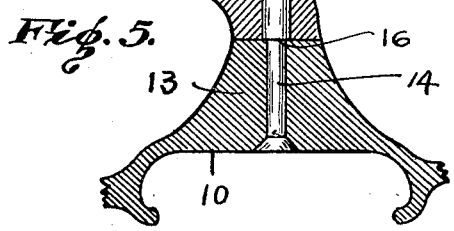

UNITED STATES PATENT OFFICE.

AUGUST H. ALBERSHARDT, OF MARTINSVILLE, INDIANA.

EMERGENCY VEHICLE-WHEEL.

1,324,776.     Specification of Letters Patent.     Patented Dec. 16, 1919.

Application filed August 7, 1916. Serial No. 113,594.

*To all whom it may concern:*

Be it known that I, AUGUST H. ALBERSHARDT, a citizen of the United States, residing at Martinsville, in the county of Morgan and State of Indiana, have invented certain new and useful Improvements in Emergency Vehicle-Wheels, of which the following is a specification.

The object of this invention is to provide a rim and assembled pneumatic tire for vehicles, adapted to be carried for emergency purposes and securely and quickly fastened to the spokes and rim of the regular wheel of the vehicle when the tire of the latter is punctured, thereby enabling the journey to be continued home or to some convenient place for the permanent and proper repair of the deflated tire.

A further object is to provide an auxiliary rim and tire for the above purpose which will be capable of attachment to wheels on either side of a vehicle, either front or rear.

I accomplish the above, and other objects which will hereinafter appear, by the mechanism illustrated in the accompanying drawings, in which—

Figure 1 is a cross section on the line 1—1 of Fig. 2 of the felly, rim and deflated tire of an automobile wheel of well known construction, with my invention also in cross section fastened thereto. Fig. 2 is a cross section through the same spoke shown in Fig. 1, looking outwardly or toward the felly, and showing the same attaching means and construction illustrated in Fig. 1. Fig. 3 is a view similar to Fig. 2, of a modified form of my device for use with a wheel having wire spokes. Fig. 4 is a cross section of the modified form of Fig. 3, similar to Fig. 1, and Fig. 5 is a section on the line 5—5 of Fig. 2.

Like characters of reference indicate like parts throughout the several views of the drawings.

Referring to Figs. 1 and 2, of the drawings, 6 is the felly, generally of wood, 7 one of the spokes of like material, 8 the customary clencher rim supported by the felly, and 9 a pneumatic tire in a deflated condition.

The above named parts are old, but to them the novel features of my invention are attached. These novel features comprise, essentially, a rim 10, having a clencher-channel which receives and retains a pneumatic tire 11, in the usual manner, the tire in the drawings being shown as inflated.

Laterally and integrally of the rim is a flange 12, which may be continuous and annular as shown. The outer face of flange 12 is channeled to receive the side of the rim 8 in a manner shown, to secure a bearing for the flange 12 thereagainst which will transmit the load from the rim 8 without slippage between the said contacting members.

On the inner face of the rim 10 are truncated bosses 13, equal to or less in number than the number of spokes in a wheel, and located opposite said spokes. These are provided with radial holes, preferably a little to one side of the plane $x$—$x$, through the middle of the channel in the rim 10, to receive bolts 14, which pivotally secure brace-arms 15 to said bosses. The arms are preferably recessed to let the bolt heads in as shown, and the adjacent portion of the bolt is larger in diameter than the remainder to form a shoulder 16, (see Fig. 5) which bears upon the truncated end of the boss and provides a stop and bearing which insures freedom of swinging adjustment of the arm on the boss. This is desirable in shifting the arm from one side of the rim 10 to the other or into the plane $x$—$x$ for packing and storage. The outer end of the arm is curved to fit the contour of the side of the spoke and the adjacent felly where the two latter members join.

Through a hole suitably formed through a lug 17, integral with the brace-arm 15, is a rod 18, having a hook 19, which engages the opposite side of the spoke from that contacted by the adjacent arm 15. The end of the rod 18 passing through the lug 17 is screw threaded and on a part projecting through the lug is a wing-nut 19', and by turning said wing-nut in the proper direction the spoke is impinged between the arm 15 and hook 19, and the rim 10 and its attached tire securely fastened to the wheel with the deflated tire. The machine can be run in home or to a place for permanent repair on the auxiliary tire 11.

Because the rims of the rear wheels of automobiles are commonly of less diameter, and broader, the same flange 12 will not fit all four wheels. I therefore provide a flange extension 20, from the rim 10, on the opposite side from flange 12, of the desired diameter, and, by reason of the arm 15 being swingingly adjustable and the internal diameters of the fellies being substantially the same, the arm, with its hooked rod is turned around to coöperate with the flange extension 20.

In the modification shown in Figs. 3 and 4, where the invention is to be applied to wheels with wire spokes, the arm 15' has a cross-bar 22, long enough to bear against an adjacent pair of spokes, and the rod 18' has a similar cross-bar 23, long enough to bear against three spokes, or as many in each case as may be deemed necessary. These cross-bars are terminated with hooks 24, to better engage the spokes. The construction in other respects, and operation, are the same as for the forms shown in Figs. 1, 2 and 5.

While I have described my invention with more or less minuteness as regards details of construction and arrangement and as being embodied in certain precise forms, I do not desire to be limited thereto unduly or any more than is pointed out in the claims. On the contrary, I contemplate all proper changes in form, construction, and arrangement, the omission of immaterial elements, and the substitution of equivalents as circumstances may suggest or as necessity may render expedient.

I claim:—

1. The combination, with a vehicle wheel having spokes and a tire-holding rim, of a second rim holding an inflated tire, said second rim being provided in its side edge with a channel for seating the adjacent edge of the tire holding rim, a plurality of bracing members carried by said second rim and bearing against the spokes of said wheel, and adjustable means to retain said contacting parts immovably in said position.

2. The combination, with a vehicle wheel having spokes and a tire-holding rim, of a second rim holding an inflated tire, said second rim being provided in its side edge with a channel for seating the adjacent edge of the tire holding rim, a plurality of bracing members carried by said second rim and bearing against the spokes of said wheel, rods passing through the bracing members and provided with hooks for engaging the opposite sides of the spokes from the sides contacted by said bracing members, the opposite ends of the rods being screw-threaded, and nuts on said threaded ends to tighten the hooks and bracing members against the spokes.

3. The combination, with a vehicle wheel having spokes and a tire-holding rim, of a second rim holding an inflated tire and having a plurality of concentric rim-bearing members one of which contacts the rim of said wheel fitting the contour thereof where the contact occurs, a plurality of bracing members carried by the second rim and bearing against the spokes of said wheel, and means carried by the second rim to clampingly engage the spokes against said spoke-bracing members of the rim.

4. The combination, with a vehicle wheel having spokes and a tire-holding rim, of a second rim holding an inflated tire and having a plurality of concentric rim-bearing members one of which contacts the rim of said wheel fitting the contour thereof where the contact occurs, a plurality of bracing members carried by the second rim and bearing against the spokes of said wheel, and means carried by the second rim to clampingly engage and hold the spokes against said spoke-bracing members of the rim, said last means being attached to the second rim by radial pivots.

In witness whereof I have hereunto set my hand and seal at Indianapolis, Indiana, this 14th day of July, A. D. one thousand nine hundred and sixteen.

AUGUST H. ALBERSHARDT. [L. S.]